July 14, 1970     P. R. RININGER     3,520,561

PIPE COUPLING

Filed July 22, 1968

INVENTOR
PAUL R. RININGER
BY
Christie, Parker & Hale
ATTORNEYS

United States Patent Office 3,520,561
Patented July 14, 1970

3,520,561
PIPE COUPLING
Paul R. Rininger, Woodland Hills, Calif., assignor to Global Marine Inc., Los Angeles, Calif., a corporation of Delaware
Filed July 22, 1968, Ser. No. 746,382
Int. Cl. F16l *55/00*
U.S. Cl. 285—24                    11 Claims

ABSTRACT OF THE DISCLOSURE

A tubing coupling having male and female components secured to adjacent ends of a pair of aligned lengths of pipe or oil well casing, for example. The female component is internally threaded and is spaced along the exterior of its section of tubing from the tubing end. The end of the tubing protruding beyond the female component seats within the externally threaded male component which is mounted to the end of its section of tubing. The pipe extending beyond the female coupling component guides the components into alignment with each other so that the coupling can be rapidly and accurately assembled without cross-threading.

BACKGROUND OF THE INVENTION

Field of the invention

This invention relates to tubing couplings and, more particularly, to tubing couplings in which cooperatively threaded male and female components are guided into alignment by the end of the tubing to which the female component is mounted.

Review of the prior art

During the drilling of an oil well, for example, by rotary tool techniques, it is necessary periodically, as the well is extended farther and farther into the ground, to add joints of drill pipe to the upper end of a vertical drill pipe string which carries a cutting tool at its lower end. When the cutting tool requires service or replacement, all sections of pipe which have been extended into the ground must be removed therefrom until the tool is raised to an accessible location. Thereafter, the pipe sections are reconnected as the tool is run back into the hole.

In making up the coupling between adjacent joints of drill pipe, the joints are usually disposed in a vertical relation. The lowermost joint conventionally is held by slips in a rotary table which forms a portion of the structure of the drilling rig. The joint to be connected to the joint held in the rotary table conventionally is suspended from the travelling block of a drilling rig derrick. Conventional drill pipe couplings rely upon a threaded connection between the two principal components of the coupling which are secured to the extremities of the pipe joints to be connected.

Ideally, the derrick travelling block is located directly over the rotary table such that a pipe joint suspended from the travelling block tends to align itself with a joint of pipe engaged in the rotary table. It is not at all uncommon, however, for the travelling block to be swaying laterally within the derrick as the result of operations previously performed in the derrick. The drilling of an oil well is a costly process and therefore operations associated with drilling are performed as rapidly as possible to minimize expense. For this reason, it is not always desirable to allow the travelling block to stop its pendulous movement to permit the lower end of a pipe joint suspended from the block to align itself with the pipe joint supported in the rotary table. As a result, manual effort is required in order to bring the lower end of the suspended pipe joint to a stationary position in alignment with the upper end of the joint held in the rotary table while the travelling block is lowered to bring the components of the coupling into register with each other and while the components are rotated relative to each other to make up the coupling. This task is difficult to perform properly under even the most favorable conditions, as where drilling is carried out on shore with relatively little or no wind. If the drilling rig is exposed to wind of significant magnitude, or if the drilling rig is located on a floating vessel subject to rolling, pitching or heaving motions, the task of properly aligning the suspended joint with the joint held in the rotary table becomes extremely difficult. Where working conditions are less than perfect, as is the usual case on a floataing vessel, the procedure of making up a coupling between adjacent joints of pipe in a drill string can become a time consuming and, therefore, costly process.

Unless the coupling components are properly aligned with each other at the time they are brought into engagement, the cooperating threads on the male and female components of the coupling will be cross-threaded. Cross-threading produces stripped threads and is not readily discernible since power tools commonly are used to handle the pipe joints during the coupling procedure. It is not at all uncommon, therefore, that a cross-threaded coupling may be lowered into the hole to fracture or strip completely when drilling operations are fully resumed.

Damage to the threads of the components of conventional pipe couplings can be quite costly since such components conventionally are either butt welded or screwed (see U.S. Pat. 1,637,628) to the ends of the pipe joints, or machined into upset ends of the pipe as shown in U.S. Pat. 2,062,407, for example. If a component of a coupling becomes damaged, it is necessary that the component be removed from the pipe joint and a replacement component welded into place on the joint, or that the pipe be scrapped. For all these reasons, therefore, it is necessary that a pipe joint coupling which is either self-aligning sufficiently that cross-threading of threads is eliminated, or is insensitive to misalignment, is needed. This invention fulfills this need by providing a coupling which automatically aligns the components of the coupling sufficiently that, when the components are brought into engagement with each other, the threads engage without problems of cross-threading and stripped threads. Moreover, the structure of the coupling components is such that the requirement for precision welds to secure the components to the joints involved is reduced significantly from corresponding requirements associated with existing coupling structures.

For reasons related to those set forth above concerning drill pipe, this invention is also useful in conjunction with oil well conductor pipe, riser pipe and well casing, for example.

It should be understood that in the parlance prevailing relative to oil well drilling, the term "pipe" is used to refer to the tubing which is used in making up the drill string which carries the rotary cutting tool at its lower end. Such pipe normally is of special physical and metallurgical character to suit it to withstand the torsional and tension loads imposed upon it during the drilling of holes of extreme depth. Conventionally, the ends of drill pipe are upset to be thicker adjacent the ends than along the remainder of the length of the pipe, special coupling configurations being machined into the upset portions of the pipe.

The term "casing" generally is used to refer to tubing which is used as conductor pipe, riser ducts and the like which is not required to be rotated to drive a rotary tool. The ends of a length of casing may or may not be threaded to facilitate their interconnection with one another.

SUMMARY OF THE INVENTION

Generally speaking, this invention provides a coupling for joining lengths of tubing, either drill pipe or casing, in end-to-end relation. The coupling includes a male component which defines an axial bore through it between opposite ends of the component. The bore at and adjacent one end thereof has a diameter which corresponds to the outer diameter of the tubing lengths to be joined. The male component defines an internal shoulder peripherally of the bore at a location a selected distance along the bore from the one end of the component. The extent of the shoulder radially of the bore is at least equal to the wall thickness of the tubing lengths to be joined. The exterior of the male component for a second selected distance from the one end of the component is externally threaded. The other end of the male component is adapted to be secured to the end of a length of tubing, as by welding. The coupling also includes a unitary female component having an axial bore, one end of which is internally threaded to cooperate with the male component external threads. The remainder of the bore through the female component has a diameter corresponding to the outer diameter of the tubing to be joined. The female component is so configured that it may be secured to a length of tubing around the exterior of the tubing at a location spaced along the tubing from the end thereof in such a manner that the distance from the end of the tubing to which the female component is mounted to the adjacent end of the remainder portion of the bore through the female component is substantially equal to the distance of the shoulder in the bore of the male component from the one end of the male component. Accordingly, when the coupling is made up by engagement of the cooperating threads of the male and female components, the portion of the tubing which extends through and beyond the female component cooperates with the bore through the male component to assure alignment of the threads at the time they begin to engage, and the end of which abuts the shoulder in the male component to effect a seal when the threads are fully made up.

DESCRIPTION OF THE DRAWINGS

The above-mentioned and other features of this invention are more fully set forth in the following detailed description of presently preferred embodiments of the invention, which description is presented in connection with the accompanying drawings in which.

DESCRIPTION OF THE PREFERRED EMBODIMENTS

Figure 1:
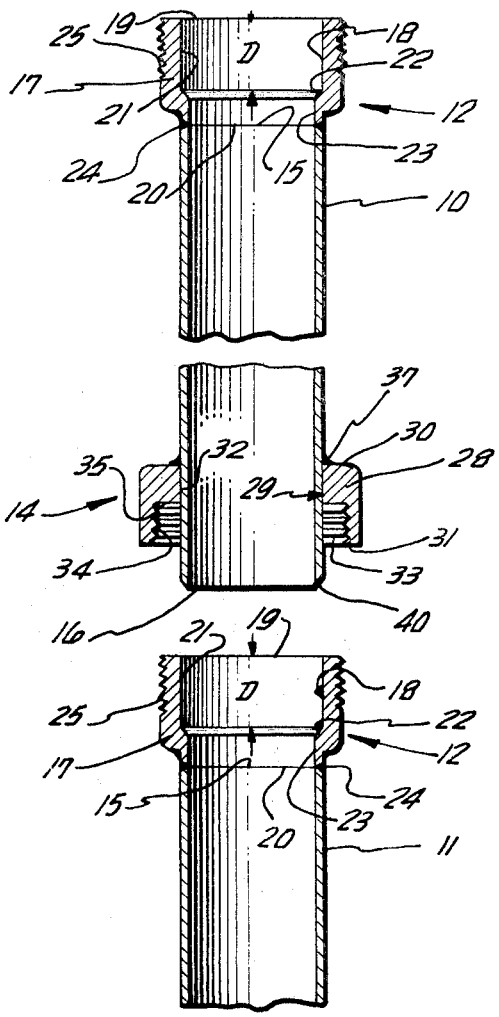
FIG. 1 is a fragmentary section view of two adjacent lengths of tubing fitted with a coupling according to this invention.

Referring initially to FIG. 1, a section of tubing 10, which may be either a length of drill pipe of uniform wall thickness along its length or a length of oil well casing, for example, is shown fitted with a male coupling component 12 and a female coupling component 14 at respective ends 15 and 16 of the tubing. The male component has a generally tubular shape and includes an elongate cylindrical, sleeve-like body 17 having an axial bore 18 between opposite ends 19 and 20 of the body. At and adjacent body end 19, bore 18 has a larger diameter portion 21 of diameter slightly greater than the outer diameter of tubing 10. Bore portion 21 has a length D from body end 19 to a bevelled shoulder 22 which separates bore portion 21 from a smaller diameter bore portion 23. Bore portion 23 extends from the shoulder to body end 20 and has a diameter which is essentially equal to the inner diameter of tubing 10. The shoulder opens toward body end 19 and has a dimension radially of bore 18 equal to the wall thickness of tubing 10. Preferably the bevel angle of shoulder 22 is within the range of from 15° to 45°.

Adjacent its end 20, the body of male component 12 has a wall thickness equal to the wall thickness of tubing 10 to facilitate connection of the male component to tubing end 15 by welding 24; the wall thickness of the remainder of the male component preferably is greater, as shown in FIG. 1, to enable the provision in the body adjacent end 19 of external threads 25 which terminate at body end 19. Threads 25 are formed in a cylinder concentric to the axis of bore 18; that is, threads 25 are not tapered along the length of the body. Thus, as will be shown, the male and female coupling components may be threaded together sufficiently to assure a tight seal between shoulder 22 and end 16 of tubing length 10.

Female coupling component 14, secured to end 16 of tubing 10, has a collar-like body 28 having an axial bore 29 between its opposite ends 30 and 31. Adjacent body end 30, bore 29 has a small diameter portion 32 having a diameter which is only slightly greater than the outer diameter of tubing 10. Bore portion 32 opens to a larger diameter bore portion 33 which is internally threaded at 34 to cooperate with threads 25 of a male coupling component 12. The junction between bore portions 33 and 34 is bounded by a shoulder 35 opening toward end 31 of body 28.

As shown in FIG. 1, female coupling component 14 is secured by weldment 37 around the exterior of tubing 10 sufficiently far along the tubing from tubing end 16 that the distance between shoulder 35 of the female component from tubing end 16 is at least equal to distance D. End 16 of the tubing is chamfered to mate with shoulder 22 in a male coupling component connected to end 15 of a second tubing length 11.

Tubing lengths 10 and 11 are connected together by inserting the portion of tubing length 10 which projects beyond shoulder 35 of the female coupling component mounted to tubing 10 into bore portion 21 of the male component mounted to tubing length 11. The clearance between the outer diameter of tubing 10 and bore portion 21 is sufficiently small, and the length of distance D is sufficiently great, that tubing lengths 10 and 11 must be essentially coaxially aligned before the male and female coupling components can be moved close enough together than engagement of threads 25 and 34 becomes possible. Therefore, the structures of the coupling components are cooperatively arranged to assure sufficient alignment of tubing lengths 10 and 11 when the components themselves abut that threads 25 and 34 cannot cross-thread with each other. The structure of one of the tubing lengths is used as a guide in assuring proper engagement of components 12 and 14 in the made-up coupling, and this guide is arranged so that it cannot contact and thereby damage any of the coupling threads as the coupling components are moved together. It is preferred that distance D be at least one half the outer diameter of the tubing of interest to assure proper alignment of the coupling components at the time the threads are brought into engagement.

After components 12 and 14 have been properly aligned with each other as described above, the components are screwed together until end 16 of tubing 10 engages shoulder 22 in the male component on tubing 11 sufficiently tightly to provide a tight seal between the tubing lengths.

Figure 2:
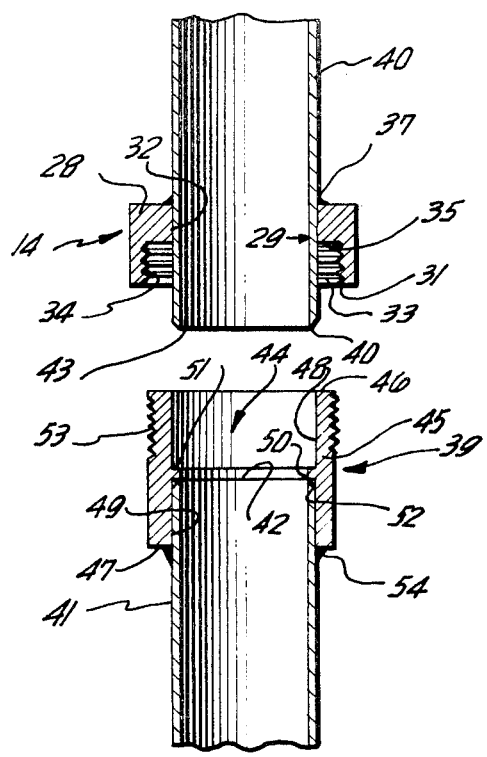
FIG. 2 is a cross-sectional view, similar to FIG. 1, showing another embodiment of the invention.

FIG. 2 shows another coupling which is comprised of a male component 39 and a female component 14 secured to opposite ends 42 and 43 of a pair of tubing lengths 40 and 41. Tubing length 40 is like tubing length 10 except that end 43 of length 40 is not chamfered as is end 16 of length 10. End 42 of tubing 41 is chamfered.

Male coupling component 39 has an axial bore 44 formed in a body 45 of the component between ends 46 and 47. Bore 44 has opposite large diameter portions 48 and 49 having diameters sized to make a tight slip fit with the outer diameters of tubing lengths 40 and 41, respectively, and these bore portions are separated by a central small diameter bore portion 50 having a diameter equal to the common inner diameter of the tubing lengths. Bore portion 48 terminates at bore portion 50 in a shoulder 51 configured to mate with end 43 of tubing length 40, and bore portion 49 terminates at bore portion 50 in a shoulder 52 configured to mate with end 42 of tubing length 41.

The exterior of body 45 adjacent its end 46 defines threads 53 configured to mate with internal threads 34.

As shown in FIG. 2, coupling component 39 is mounted on tubing length 41 by inserting tubing end 42 into bore portion 49 until the tubing end abuts shoulder 52, and by making a simple weld 54 around the tube at end 47 of the component body. The coupling components are then connected, using the part of tubing 40 which projects through and beyond bore portion 33 of female component 14 as a tubing alignment guide, in the manner described above.

Tubing end 43 could be chamfered like tubing end 16, if desired, and in such case shoulder 51 preferably is bevelled like shoulder 22. Conversely, tubing end 42 may be unchamfered and shoulder 52 may be unbevelled without departing from the scope of this invention.

Figure 3:
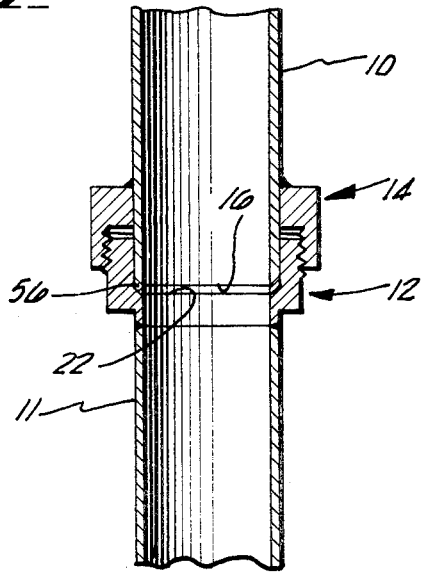
FIG. 3 is a view similar to FIG. 1 showing yet another embodiment of the invention.

FIG. 3 illustrates that an O-ring gasket 56 may be disposed between tubing end 16 and shoulder 22 if desired. A similar gasket may be used between tubing end 43 and shoulder 51, if desired.

Coupling components 12 and 14, and components 39 and 14 are so cooperatively configured in combination with the tubing lengths to which they are mounted, and are so mounted to the tubing lengths, that the tubing length to which female component 14 is mounted functions as an alignment guide which prevents cross-threading during the process of making up the couplings. Also, the coupling components may be machined economically as separate units from the tubing lengths which can be purchased without threads machined in the ends thereof. Since it is a simple and economic matter to properly weld the coupling components to the appropriate ends of relatively inexpensive tubing lengths, it is apparent that the tubing and coupling component assemblies of this invention can be made rapidly and very economically.

Should the threads of a coupling according to this invention become stripped or damaged in use during the drilling of a submarine oil well, for example, such that replacement of one or both components of a coupling is required, such replacement can be achieved rapidly, economically, and without the use of specialized tools or equipment, even on a floating drilling vessel. The damaged coupling component can be removed from its tubing length by removal of the securing weldment through the use of a simple pneumatic chipping gun. The damaged coupling component is then removed from the tubing length and either discarded or retained for subsequent reworking, and a spare component of like sex is mounted to the tubing in place of the removed component. If the removal of the damaged component weakens the tubing at the location of the severed weldment, it is a simple matter to saw off a short length of the tubing to present a fresh end to which the replacement coupling may be welded. It is thus apparent that the present couplings not only prevent cross-threading thereof, they also provide couplings which are less costly and more easily repaired or replaced, even on board a drilling vessel, than prior couplings available for like uses. The advantages of the present couplings are to be compared with the limitations present in couplings machined into upset ends of drill pipe; damage to couplings in upset drill pipe requires that the entire pipe length be discarded, whereas the use of the present couplings permits the useful salvage of the major portion of frequently costly tubing lengths.

What is claimed is:

1. In combination with first and second similar lengths of tubing of uniform uninterrupted inner and outer diameter, a coupling for joining the tubing lengths in an end-to-end relation, the coupling comprising a male component having an axial bore therethrough of diameter at and adjacent one end thereof only slightly greater than but essentially equal to the outer diameter of the first of said tubing lengths, the male component defining an internal shoulder around the bore a selected distance from the one end thereof and open to the one end thereof for abutting one end of the first length of tubing, the exterior of the male component defining external threads therealong from the one end thereof, the other end of the component being welded to an end of the second length of tubing, and a unitary female component having an axial bore therethrough one end of which is internally threaded to cooperate with the male component external threads and the remainder of which has a diameter only slightly greater than but essentially equal to the outer diameter of the first length of tubing to be joined, the female component being welded to the first length around the exterior thereof in spaced relation to the one end of the first length.

2. Apparatus coupling according to claim 1 wherein the threads are defined in cylinders concentric to the bores of the respective coupling components.

3. In combination with first and second similar lengths of tubing of uniform inner and outer diameter, a coupling for joining the tubing lengths in end-to-end relation, the coupling comprising a male component having an axial bore therethrough of diameter at an adjacent one end thereof only slightly greater than but essentially equal to the outer diameter of the first of said tubing lengths the male component defining an internal shoulder around the bore a selected distance from the one end thereof and open to the one end thereof for abutting one end of the first length of tubing, said bore from the shoulder to the other end thereof having a diameter essentially equal to the inner diameter of the second length of tubing, the exterior of the male component defining external threads therealong from the one end thereof, the other end of the component being welded to an end of the second length of tubing, and a unitary female component having an axial bore therethrough one end of which is internally threaded to cooperate with the male component external threads and the remainder of which has a diameter only slightly greater than but essentially equal to the outer diameter of the first length of tubing to be joined, the female component being welded to the first length around the exterior thereof in spaced relation to the one end of the first length.

4. Apparatus coupling according to claim 1 wherein the male component bore, from the other end thereof essentially to the shoulder, has a diameter only slightly greater than but essentially equal to the outer diameter of the second length of tubing.

5. Apparatus coupling according to claim 1 wherein the shoulder extends circumferentially of the male component bore and inwardly of the bore a distance substantially equal to the wall thickness of the first length of tubing.

6. In combination with a pair of tubing lengths, a coupling for joining the lengths together in end-to-end relation comprising a unitary male sleeve fixed to one end of one length and extending coaxially away from the one length to one of the opposite ends of the sleeve, the sleeve having an axial bore at least a portion of which is sized to make a slip fit with the exterior of the other length for a selected distance along the other length from one end thereof, the exterior of the sleeve from the one end thereof defining exterial threads, and a unitary female collar fixed to the other length around the circumference thereof inwardly of the extent of the other length from the one end thereof and defining an annular recess therein concentric to the other length, the recess opening toward the one end of the other length, the collar being positioned on the other length so that the distance from the one end of the other length to the base of the recess is approximately equal to but not less than said selected distance, the collar along the recess defining internal threads arranged to cooperate with the sleeve external threads, the depth of the recess being less than the selected distance so that the one end of the other tubing length is disposed outwardly of the recess, the pair of tubing lengths having uniform inner and outer diameters at least throughout the coupling area.

7. Apparatus according to claim 6 wherein the sleeve and the collar are welded to the one and the other tubing length, respectively.

8. Apparatus according to claim 7 wherein the weld of the sleeve to the one tubing length is spaced along the length from the one end thereof.

9. Apparatus according to claim 6 wherein the internal and external threads are formed along cylinders concentric to the respective tubing lengths.

10. In combination with a pair of lengths of tubing, a coupling for joining the tubing lengths in end-to-end relation comprising a male component and a unitary female component, the male component being immovably mounted at one of its opposite ends to one end of the tubing lengths and defining an axial bore therethrough between the opposite ends thereof, the male component defining a shoulder around the bore thereof a selected distance from its other end which opens toward said other end of the male component, the bore from the shoulder to the male component other end having a diameter only slightly greater than but essentially equal to the outer diameter of the other of the tubing lengths, and external threads defined along the exterior of the male component from the other end thereof; the female component having an axial bore therethrough between opposite ends thereof, the female component bore having a first portion extending from one end thereof having a diameter only slightly greater than but essentially equal to the outer diameter of the other tubing length and a second portion having a diameter corresponding to the outer diameter of the male component at the other end thereof and defining internal threads arranged to cooperate with the male component external threads, the female component being fixed circumferentially and coaxially to the other tubing length inwardly of one end of the other length, with the female component bore second portion toward the one end of the other length, at such a position that the distance from the one end of the other length to the proximate end of the female component bore first portion is approximately equal to but is not less than said selected distance, the axial extent of the female component bore second portion being less than the selected distance, the pair of tubing lengths having uniform inner and outer diameters at least throughout the coupling area.

11. In combination with a pair of tubing lengths, a coupling for joining the lengths together in end-to-end relation comprising a male sleeve secured to one end of one length and extending coaxially away from the one length to one of the opposite ends of the sleeve, the sleeve having an axial bore at least a portion of which is sized to make a slip fit with the exterior of the other length for a selected distance along the other length from one end thereof, the sleeve defining a shoulder circumferentially of the bore at a location of said selected distance along the bore from the sleeve one end for abutting the one end of the other tubing length when the coupling is assembled, the exterior of the sleeve from the one end thereof defining external threads, and a female collar secured to the other length around the circumference thereof inwardly of the extent of the other length from the one end thereof and defining an annular recess therein concentric to the other length, the recess opening toward the one end of the other length, the collar being positioned on the other length so that the distance from the one end of the other length to the base of the recess is approximately equal to but not less than said selected distance, the collar along the recess defining internal threads arranged to cooperate with the sleeve external threads, the depth of the recess being less than the selected distance so that the one end of said other length to which the female collar is secured abuts the shoulder of the male sleeve when the internal and external threads are engaged.

References Cited
UNITED STATES PATENTS

| | | | |
|---|---|---|---|
| 1,074,706 | 10/1913 | Ferguson | 285—331 |
| 2,446,481 | 8/1948 | Letterman | 285—286 X |
| 2,926,027 | 2/1960 | Marquis | 285—32 |
| 3,202,442 | 8/1965 | Abbey et al. | 285—331 X |
| 861,828 | 7/1907 | Grindrod et al. | 285—384 X |
| 2,574,081 | 11/1951 | Abegg | 285—383 X |

FOREIGN PATENTS

| | | |
|---|---|---|
| 12,031 | 6/1880 | Germany. |
| 406,685 | 2/1934 | Great Britain. |
| 507,269 | 7/1952 | Italy. |

DAVE W. AROLA, Primary Examiner

U.S. Cl. X.R.

285—286, 390

PO-1050
(5/69)

UNITED STATES PATENT OFFICE
CERTIFICATE OF CORRECTION

Patent No. 3,520,561          Dated  August 13, 1970

Inventor(s)  Paul R. Rininger

It is certified that error appears in the above-identified patent
and that said Letters Patent are hereby corrected as shown below:

Col. 6, line 29, delete the word "coupling";
       line 39, insert a comma (,) after "lengths";
       line 59, delete the word "coupling";
       line 64, delete the word "coupling"

Col. 7, line 32, after "end" insert --of one--.

Col. 8, line 17, delete "of" (second appearance).

SIGNED AND
SEALED
OCT 20 1970

(SEAL)
Attest:

Edward M. Fletcher, Jr.
Attesting Officer

WILLIAM E. SCHUYLER, JR.
Commissioner of Patents